United States Patent
Makino et al.

(10) Patent No.: US 8,545,610 B2
(45) Date of Patent: Oct. 1, 2013

(54) FUEL VAPOR TREATING APPARATUSES HAVING A HIGH THERMAL CONDUCTIVE HONEYCOMB CORE

(75) Inventors: Katsuhiko Makino, Aichi-ken (JP); Nobutaka Teshima, Toyota (JP); Junya Kimoto, Obu (JP); Masakazu Hasegawa, Miyoshi (JP); Shota Yamanaka, Hekinan (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 0 days.

(21) Appl. No.: 13/192,645

(22) Filed: Jul. 28, 2011

(65) Prior Publication Data
US 2012/0024158 A1    Feb. 2, 2012

(30) Foreign Application Priority Data

Jul. 30, 2010   (JP) ................. 2010-171967
Jul. 30, 2010   (JP) ................. 2010-171969
Jul. 30, 2010   (JP) ................. 2010-171972

(51) Int. Cl.
B01D 53/02    (2006.01)

(52) U.S. Cl.
USPC .......... 96/134; 123/519; 96/135; 96/136; 96/139; 96/146; 96/152

(58) Field of Classification Search
USPC .......... 96/154, 134, 135, 136, 139, 146, 96/152; 428/54, 68, 984; 123/519
See application file for complete search history.

(56) References Cited

U.S. PATENT DOCUMENTS

| 5,110,328 | A  | * | 5/1992  | Yokota et al. ........... 96/112 |
| 5,317,869 | A  | * | 6/1994  | Takeuchi .................. 60/300 |
| 5,514,347 | A  | * | 5/1996  | Ohashi et al. ............ 422/174 |
| 7,753,034 | B2 | * | 7/2010  | Hoke et al. ............... 123/519 |
| 7,789,075 | B2 |   | 9/2010  | Makino |
| 2007/0266997 | A1 | * | 11/2007 | Clontz et al. ............. 123/519 |

FOREIGN PATENT DOCUMENTS

| JP | 56-92036    | 12/1954 |
| JP | 55 119419   | 9/1980  |
| JP | 55 149722   | 11/1980 |
| JP | 59-179265   | 10/1984 |
| JP | 59 179265   | 10/1984 |
| JP | 61118956 U  | 7/1986  |
| JP | 64-81186    | 3/1989  |

(Continued)

OTHER PUBLICATIONS

Japanese Office Action mailed Aug. 20, 2013, corresponding to Japanese Patent Application No. 2010-171967; with English language translation.

(Continued)

Primary Examiner — Duane Smith
Assistant Examiner — Cabrena Hall
(74) Attorney, Agent, or Firm — Ladas & Parry, LLP

(57) ABSTRACT

An adsorbent canister has a housing defining an adsorption chamber therein, an adsorbent filled in the adsorption chamber, and a honeycomb core. The honeycomb core is made from a material having a higher thermal conductivity than the adsorbent, defines therein a plurality of cells passing through the honeycomb core and is disposed in the adsorption chamber. The adsorbent canister can further have a heater for heating the honeycomb core or the honeycomb core can be made from a material, which produce heat when current is applied.

11 Claims, 10 Drawing Sheets

(56) References Cited

FOREIGN PATENT DOCUMENTS

| JP | 5-21158 | 3/1993 |
|---|---|---|
| JP | 5-174945 | 7/1993 |
| JP | 6-106357 | 4/1994 |
| JP | 08 022905 | 1/1996 |
| JP | 9-254285 | 9/1997 |
| JP | 11270794 | 10/1999 |
| JP | 2001 182632 | 7/2001 |
| JP | 2003-293866 | 10/2003 |
| JP | 2003-314384 | 11/2003 |
| JP | 2003 314384 | 11/2003 |
| JP | 2005-63886 | 3/2005 |
| JP | 2009-9835 | 1/2009 |
| JP | 2009-144684 | 7/2009 |
| JP | 2009 191688 | 8/2009 |

OTHER PUBLICATIONS

Japanese Office Action mailed Aug. 27, 2013, corresponding to Japanese Patent Application No. 2010-171972; with full English translation.

* cited by examiner

FUEL VAPOR TREATING APPARATUSES HAVING A HIGH THERMAL CONDUCTIVE HONEYCOMB CORE

CROSS-REFERENCES TO RELATED APPLICATIONS

This application claims priority to Japanese patent application serial numbers 2010-171967, 2010-171969 and 2010-171972, the contents of which are incorporated herein by reference.

BACKGROUND OF THE INVENTION

1. Field of the Invention

This disclosure relates to fuel vapor treating apparatuses for treating fuel vapor vaporized in a fuel tank of a vehicle, in particular, relates to the fuel vapor treating apparatuses each having a high thermal conductive honeycomb core for improving heat-transfer efficiency in the fuel vapor treating apparatus.

2. Description of the Related Art

Japanese Laid-Open Patent Publication No. 2009-191688 discloses an adsorbent canister (fuel vapor treating apparatus) having a housing that defines an adsorption chamber therein. The adsorption chamber is filled with an adsorbent capable of temporarily trapping fuel vapor and then desorbing the fuel vapor due to airflow in the adsorption chamber.

The housing of the adsorbent canister has a grid-like partition dividing the adsorption chamber into a number of elongated spaces, which are filled with the adsorbent. The adsorbent is formed in an elongated pellet shape from powder of activated carbon. In usual, the adsorbent canister is filled with granule-shaped activated carbon.

The adsorbent such as activated carbon generally has low thermal conductivity and has a temperature-dependent adsorption capacity. That is, the adsorption capacity of the adsorbent for the fuel vapor is larger at higher temperature but is smaller at lower temperature. In addition, because adsorption of the fuel vapor onto the adsorbent is exothermic reaction, when the adsorbent adsorbs the fuel vapor, temperature of the adsorbent increases and thus adsorption ability of the adsorbent for the fuel vapor decreases with increase of temperature. On the other hand, because desorption of the fuel vapor from the adsorbent is endothermic reaction, when the adsorbent desorbs the fuel vapor, temperature of the adsorbent decreases and thus desorption ability of the adsorbent decreases with decrease of temperature. In this disclosure, adsorption ability and desorption ability of the adsorbent are referred to collectively as "adsorption and desorption ability". And, adsorption and desorption of the adsorbent are referred to collectively as "adsorption and desorption".

In the adsorbent canister having the adsorption chamber filled with the adsorbent, when the adsorbent adsorbs the fuel vapor, temperature increase in a center region of the adsorption chamber is larger than that in an outer region of the adsorption chamber. Thus, adsorption ability of the adsorbent in the center region becomes lower than that in the outer region. Whereas, when the adsorbent desorbs the fuel vapor, temperature decrease in the center region is larger than that in the outer region. Thus, desorption ability of the adsorbent in the center region becomes lower than that in the outer region. Accordingly, when adsorbing and desorbing the fuel vapor, adsorption and desorption ability of the adsorbent in the center region significantly decreases compared with that in the outer region. Therefore, there has been a need for improved adsorbent canisters.

SUMMARY OF THE INVENTION

One aspect of this disclosure includes an adsorbent canister having a housing defining an adsorption chamber therein, an adsorbent filled in the adsorption chamber, and a honeycomb core. The honeycomb core is made from a material having a higher thermal conductivity than the adsorbent, defines therein a plurality of cells passing through the honeycomb core and is disposed in the adsorption chamber.

In accordance with this aspect, during adsorption and desorption of the fuel vapor, the honeycomb core transfers heat from a high temperature region to a low temperature region in the adsorption chamber. That is, when the adsorbent adsorbs the fuel vapor, the honeycomb core transfers heat from a center region to an outer region in the adsorption chamber. And, heat transferred to the outer region is easily transferred to the housing and then is released into the environment from the housing. Thus, it is able to prevent temperature increase in the center region of the adsorption chamber and to improve adsorption ability of the adsorbent in the center region. On the other hand, when the adsorbent desorbs the fuel vapor, the honeycomb core transfers heat from the outer region to the center region in the adsorption chamber. Thus, it is able to prevent temperature decrease in the center region and to improve desorption ability of the adsorbent in the center region. Accordingly, it is able to improve the adsorption and desorption ability of the adsorbent in the center region.

DETAILED DESCRIPTION OF THE PREFERRED EMBODIMENTS

Each of the additional features and teachings disclosed above and below may be utilized separately or in conjunction with other features and teachings to provide improved adsorbent canisters. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
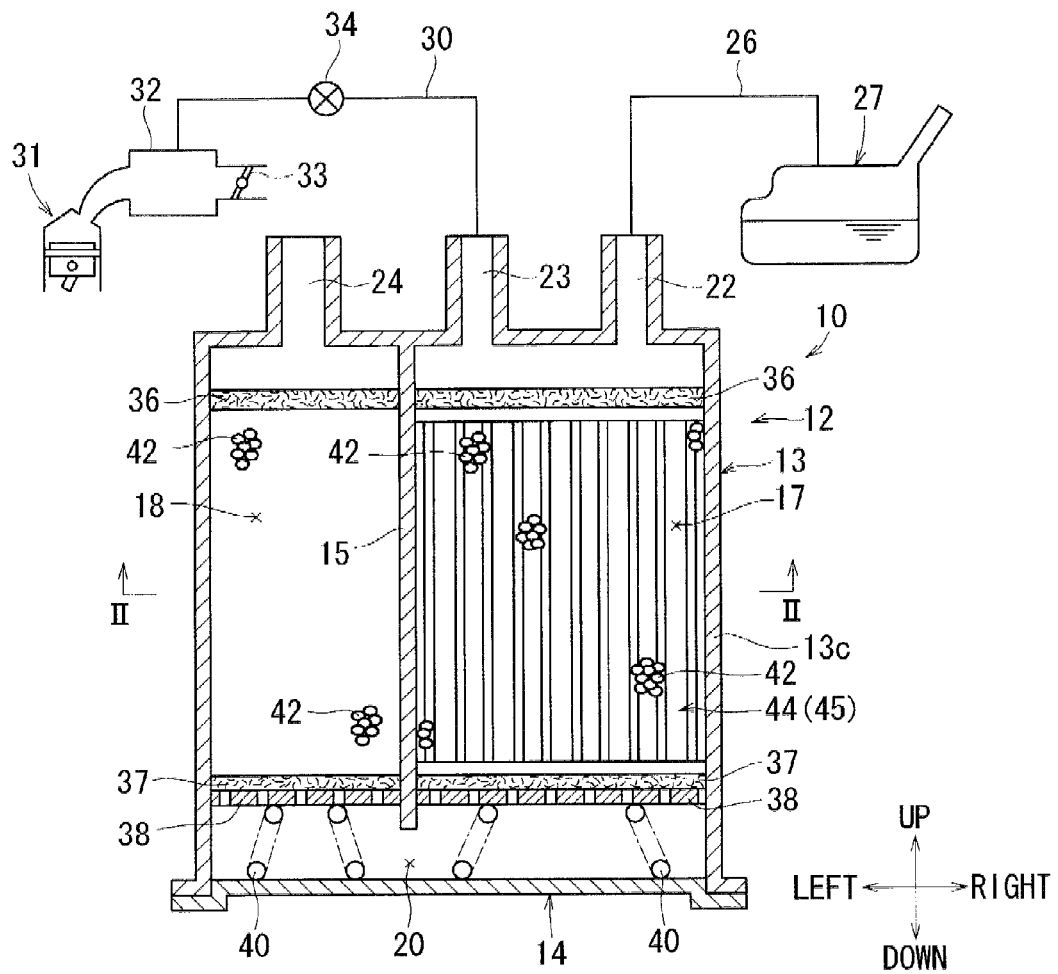
FIG. 1 is a schematic cross-sectional view of an adsorbent canister in a first embodiment.
Figure 2:
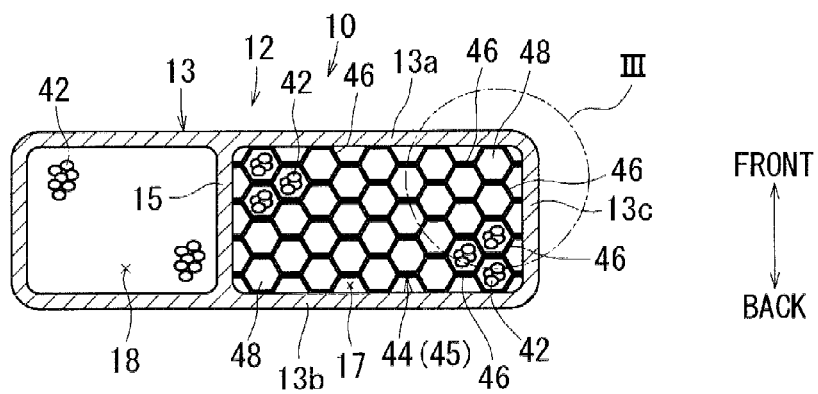
FIG. 2 is a cross-sectional view along line II-II in FIG. 1.
Figure 3:
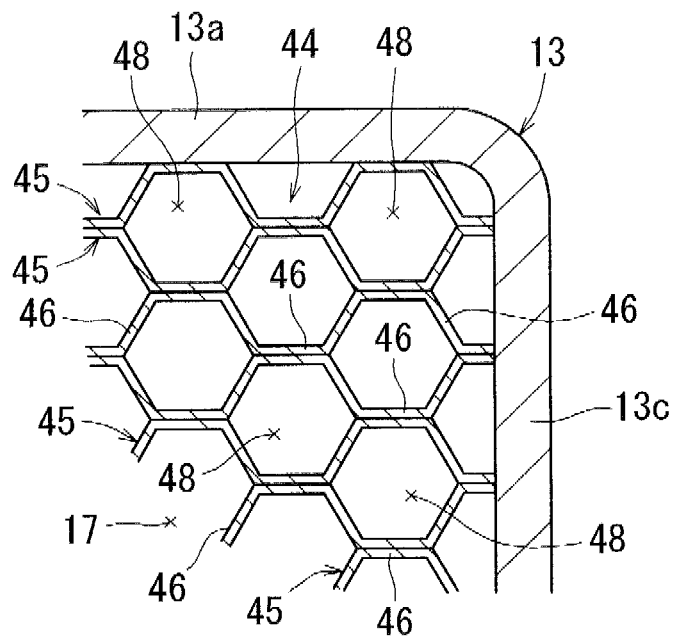
FIG. 3 is an enlarged view showing a portion III in FIG. 2.

A first embodiment of this disclosure will be described in reference to accompanying drawings. In this embodiment, an adsorbent canister (fuel vapor treating apparatus) mounted on a vehicle such as gas vehicle is exemplified. FIG. 1 is a schematic cross-sectional view of the adsorbent canister connected to a fuel tank and an internal combustion engine. FIG. 2 is a cross-sectional view along line II-II in FIG. 1. FIG. 3 is an enlarged view showing a portion III in FIG. 2. For convenience of explanation, directions (up, down, right and left directions) are defined based on FIG. 1. In addition, front and back directions are defined based on FIG. 2.

As shown in FIG. 1, an adsorbent canister 10 has a housing 12 made from a resin material. The housing 12 is composed of a housing body 13 that has a hollow rectangular cylinder shape with an upper closed end and a lower open end and a cover 14 that closes the lower open end of the housing body 13. The housing body 13 has a partition 15 dividing an inner space of the housing body 13 into a main adsorption chamber 17 on the right side and an auxiliary adsorption chamber 18 on the left side. Each of the main adsorption chamber 17 and the auxiliary chamber 18 is formed in a substantially cuboidal shape. The main adsorption chamber 17 and the auxiliary chamber 18 are fluidly connected with each other via a connection passage 20 formed in a lower end portion of the housing 12.

The housing body 13 has a tank port 22, a purge port 23 and an air communicating port 24 on its upper surface. The tank port 22 and the purge port 23 are fluidly connected to the main adsorption chamber 17. The tank port 22 is fluidly connected via a fuel vapor pipe 26 to a fuel tank 27, in particular, to an upper section of the fuel tank 27 where gas is reserved. The purge port 23 is fluidly connected to an air intake pipe 32 of an internal combustion engine 31 via a purge pipe 30. The air intake pipe 32 is provided with a throttle valve 33 for controlling intake airflow. The purge pipe 30 is connected to the air intake pipe 32 between the throttle valve 33 and the internal combustion engine 31, i.e., downstream of the throttle valve 33. The purge pipe 30 is provided with a purge valve 34 that is opened and closed by an engine control unit (ECU) (not shown). On the other hand, the air communicating port 24 is fluidly connected to the auxiliary adsorption chamber 18 and is open to the atmosphere.

The main adsorption chamber 17 is equipped with a first filter 36 at an upper end and a second filter 37 at a lower end. The auxiliary adsorption chamber 18 is also equipped with a first filter 36 and a second filter 37 in the same manner. Each of the filters 36 and 37 is made of a resin-based non-woven cloth, urethane foam or the like. In the main adsorption chamber 17 and the auxiliary adsorption chamber 18, porous plates 38 are disposed along a rear surface of each second filter 37. In addition, spring members 40 each composed of a coil spring are disposed between the porous plates 38 and the cover 14 for pressing the porous plates 38 in the upward direction.

In the main adsorption chamber 17 and the auxiliary adsorption chamber 18, an adsorbent 42 is filled between the first filters 36 and the second filters 37. The adsorbent 42 can be made from, for example, granulates of activated carbon. In addition, the granulates of activated carbon can include, for example, granular activated carbon (crushed activated carbon) and extruded activated carbon formed by shaping powdered activated carbon with a binder.

Figure 4:
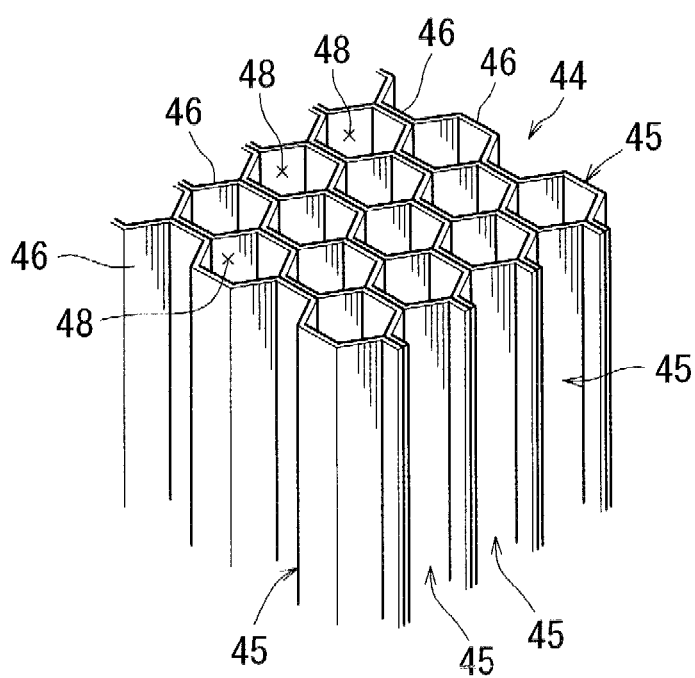
FIG. 4 is a perspective view showing a portion of a honeycomb core in the first embodiment.
Figure 5:
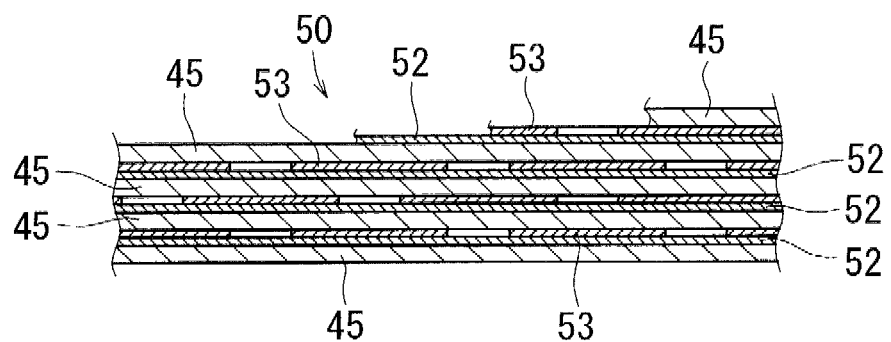
FIG. 5 is a cross-sectional view of a layered structure.

Before filling the adsorbent 42 into the main adsorption chamber 17, a honeycomb core 44 having a substantially rectangular cylinder shape is disposed in the main adsorption chamber 17. FIG. 4 is a perspective view showing a portion of the honeycomb core. FIG. 5 is a cross-sectional view showing a layered structure for the honeycomb core, which has not been expanded yet. As shown in FIG. 4, the honeycomb core 44 is made from a material having higher heat conductivity than the adsorbent 42, for example, metal film 45 such as aluminum thin film. That is, the honeycomb core 44 is made of a plurality of the metal films 45 each constituting cell walls 46 such that six cell walls 46 successively placed in a circumferential direction form a cell 48 having a hollow hexagonal cylinder shape. In manufacture of the honeycomb core 44, a plurality of (eight in this embodiment) the metal films 45 are layered each other such that two adjacent metal films 45 are bound to each other at predetermined intervals and such bound parts are aligned in a layered direction (vertical direction in FIG. 5) every other film and are positioned in the staggered manner (FIG. 5). Then, an obtained layered structure 50 is expanded in the layered direction. The cell walls 46 have double-walled structures at the bound parts where the adjacent metal films 45 are bound to each other and single wall structures at other areas where the adjacent metal films 45 are not bound. In this embodiment, a distance between each pair of the parallel cell walls 46 in the hexagonal shape can be determined within 9.0-25.4 mm. The metal films 46 have 6-200 µm thickness, preferably 10-100 µm.

One manufacture method for the honeycomb core 44 will be described. The manufacture method for the honeycomb core 44 has a step for forming the layered structure 50 (FIG. 5) and a step for expanding the layered structure 50. In the step for forming the layered structure 50, a first metal film 45 is coated with brazing filler metal 52 on its upper surface and a second metal film 45 is coated with release agent 53 on its lower surface at regular intervals, and then the second metal film 45 is disposed on the first metal film 45 such that the brazing filler metal 52 and the release agent 53 contact with each other. Then, some metal films 45 (three in FIG. 5) are disposed on the second metal film 45 in a similar way. Here, the metal films 45 are overlapped such that bound parts are aligned in the layered direction (vertical direction in FIG. 5) every other film and are positioned in the staggered manner.

Finally, the layered metal films 45 are brazed by heating and pressing in the layered direction in order to make the layered structure 50.

In the step for expanding the layered structure 50, the layered structure 50 is pulled in opposite directions such the metal films 45 of the layered structure 50 are partially displaced away from each other. In this way, the layered structure 50 is expanded in the layered direction in order to form the honeycomb core 44. The release agent 53 can be removed after forming the honeycomb core 44. The honeycomb core 44 can be made in accordance with known method, for example, manufacture method disclosed in Japanese Laid-Open Patent Publication No. S59-179265. Further, the metal films 45 can be adhered with an adhesive instead of the brazing filler metal 52.

As shown in FIG. 1, the honeycomb core 44 is disposed in the main adsorption chamber 17 such that an axial direction of each cell 48 (vertical direction in FIG. 4) is parallel to a flow direction of gas flowing through the main adsorption chamber 17 of the housing 12 (vertical direction in FIG. 1). In this embodiment, a thickness direction of the honeycomb core 44 (i.e., a direction that the layered structure 50 is expanded) is parallel to the front-back direction (vertical direction in FIG. 2), and a width direction of the honeycomb core 44 is parallel to the right-left direction of the main adsorption chamber 17 (right-left direction in FIG. 2). With respect to the honeycomb core 44, the axial direction of the cell 48 corresponds to a height (length) direction of the honeycomb core 44.

The honeycomb core 44 has front and rear surfaces each coming into contact with a front wall 13a or a back wall 13b of the housing body 13 and right and left surfaces each coming into contact with the right wall 13c of the housing body 13 or the partition 15 (FIGS. 1-3). Due to this configuration, the honeycomb core 44 is hold at a predetermined position in the main adsorption chamber 17. The honeycomb core 44 has an upper surface and a lower surface that face the first filter 36 and the second filter 37, respectively. The main adsorption chamber 17 housing the honeycomb core 44 therein is filled with the adsorbent 42. Accordingly, the cells 48 of the honeycomb core 44 are filled with the adsorbent 42 (FIG. 2).

Next, operation of a fuel vapor treating system including the adsorbent canister 10 will be described (FIG. 1). The fuel vapor treating system is composed of the adsorbent canister 10, the fuel vapor pipe 26, the fuel tank 27, the purge pipe 30, the air intake pipe 32, and the purge valve 34, etc. While the internal combustion engine 31 of the vehicle is stopped, the purge valve 34 is closed, and fuel vapor, e.g., vaporized in the fuel tank 27 is introduced into the main adsorption chamber 17 via the fuel vapor pipe 26. In the main adsorption chamber 17, the fuel vapor adsorbs onto the adsorbent 42 filled in the cells 48 of the honeycomb core 44. While the fuel vapor adsorbs onto the adsorbent 42, temperature in a center region of the main adsorption chamber 17 increases much more than that in an outer region of the main adsorption chamber 17. However, because the honeycomb core 44 is made of the metal films 45 having higher thermal conductivity than the adsorbent 42, the honeycomb core 44 transfers heat from the center region to the outer region. Accordingly, temperature increase in the center region of the main adsorption chamber 17 is suppressed, so that adsorption ability of the adsorbent 42 in the center region can be improved. Remaining fuel vapor that has not adsorbed onto the adsorbent 42 filled in the cells 48 of the honeycomb core 44 in the main adsorption chamber 17 flows to the auxiliary adsorption chamber 18 through the connection passage 20 and adsorbs onto the adsorbent 42 filled in the auxiliary adsorption chamber 18.

While the internal combustion engine 31 is running, the purge valve 34 is open such that negative pressure in the internal combustion engine 31 acts on the adsorbent canister 10. Thus, ambient air is introduced into the auxiliary adsorption chamber 18 of the adsorbent canister 10 via the air communicating port 24. The air introduced into the auxiliary adsorption chamber 18 desorbs the fuel vapor from the adsorbent 42 filled in the auxiliary adsorption chamber 18. And then, the ambient air flows into the main adsorption chamber 17 through the connection passage 20 and desorbs the fuel vapor from the adsorbent 42 filled in the cells 48 of the honeycomb core 44 disposed in the main adsorption chamber 17. While the fuel vapor is desorbed from the adsorbent 42, the temperature of the center region in the main adsorption chamber 17 decreases much more than that of the outer region in the main adsorption chamber 17. However, because the honeycomb core 44 is made of the metal films 45 having higher thermal conductivity than the adsorbent 42, the honeycomb core 44 transfers heat from the outer region to the center region. Thus, temperature decrease in the center region of the main adsorption chamber 17 is suppressed, so that desorption ability of the adsorbent 42 in the center region of the main adsorption chamber 17 can be improved. Then, the air containing the fuel vapor desorbed from the adsorbent 42 is discharged (purged) into the air intake pipe 32 through the purge pipe 30 and is burned in the internal combustion engine 31.

In the adsorbent canister 10 (FIG. 1), the honeycomb core 44 made from a material, which has higher thermal conductivity than the adsorbent 42, is disposed in the main adsorption chamber 17 of the housing 12. Accordingly, when there is a temperature difference between the center region and the outer region in the main adsorption chamber 17 during adsorption or desorption of the fuel vapor, the honeycomb core 44 transfers heal from a higher temperature side to a lower temperature side. That is, when the adsorbent 42 adsorbs the fuel vapor, because the center region of the main adsorption chamber 17 has higher temperature than the outer region, the honeycomb core 44 transfers heat from the center region to the outer region in the main adsorption chamber 17. And, heat in the outer region of the main adsorption chamber 17 can be easily transferred to the housing 12 and released into the environment from the housing 12. Therefore, it is able to prevent temperature increase in the center region of the main adsorption chamber 17 and to improve adsorption ability of the adsorbent 42 in the center region of the main adsorption chamber 17. On the other hand, when the fuel vapor is desorbed from the adsorbent 42, because the outer region of the main adsorption chamber 17 has higher temperature than the center region, the honeycomb core 44 transfers heat from the outer region to the center region in the main adsorption chamber 17. Therefore, it is able to prevent temperature decrease in the center region of the main adsorption chamber 17 and to improve desorption ability of the adsorbent 42 in the center region of the main adsorption chamber 17. Accordingly, it is able to improve adsorption and desorption ability of the adsorbent 42 in the center region of the main adsorption chamber 17. This can lead to downsize of the adsorbent canister 10.

In this embodiment, because the honeycomb core 44 is disposed in the main adsorption chamber 17 such that the axial direction of the cells 48 is parallel to the flow direction of gas flowing through the main adsorption chamber 17. Thus, it is able to easily flow gas (air and/or fuel vapor) through the cells 48 of the honeycomb core 44 and to equalize flow rate of gas flowing through each cell 48.

In this embodiment, because the cell walls 46 of the honeycomb core 44 are made of the metal films 45, it is able to decrease volume of the cell walls 46 in the main adsorption chamber 17 and thus to prevent increase in flow resistance in the main adsorption chamber 17.

The front, rear, right and left surfaces of the honeycomb core 44 contact with an inwardly facing surface defining the main adsorption chamber 17, i.e., the front wall 13a, the rear wall 13b, the partition 15 and the right wall 13c of the housing body 13, respectively. Thus, because the honeycomb core 44 can easily transfer heat to the housing 12, it is able to improve radiation performance to the environment. Here, the housing 12 is exposed to ambient air. The honeycomb core 44 is not limited to this configuration and can contact with the housing body 13 via at least one portion thereof.

Figure 6:
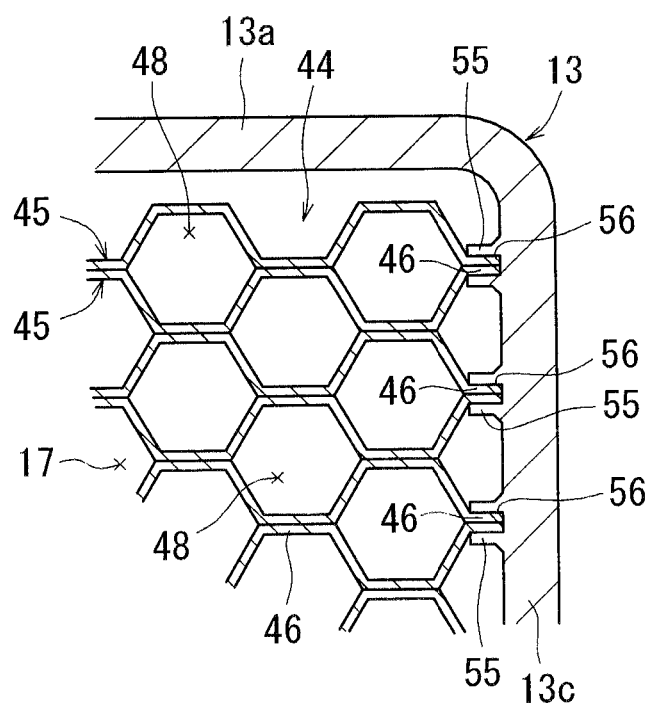
FIG. 6 is a cross-sectional view showing a portion of the adsorbent canister in a second embodiment.

A second embodiment will be described. Because this embodiment substantially corresponds to the first embodiment further having some changes, such changes will be described and the same configurations will not be described. FIG. 6 is a cross-sectional view showing support parts for holding the honeycomb core 44 in the main adsorption chamber 17. As shown in FIG. 6, support parts 55 are formed on the inwardly facing surface for the main adsorption chamber 17 of the housing 12, e.g., the right wall 13c and the partition 15 of the housing body 13 in this embodiment. The support parts 55 are symmetrically-formed on the partition 15 and the right wall 13c of the housing body 13. Thus, for convenience of explanation, the support parts 55 formed on the right wall 13c will be described, whereas the support parts 55 formed on the partition 15 will not be described.

Each of the support parts 55 is formed in a projecting rim shape extending in the vertical direction along an inwardly surface of the right wall 13c of the housing body 13. Each of the support parts 55 has a straight groove 56 capable of engaging with one of the cell walls 46 at a right end of the honeycomb core 44 such that the honeycomb core 44 can slide in the vertical direction. In addition, the cell wall 46 of the honeycomb core 44 at its right end is formed in double-walled shape having higher rigidity than a single wall structure. Although the support parts 55 are formed to engage with all cell walls 46 at the right end of the honeycomb core 44 in this embodiment, the housing body 13 can have at least one of the support parts 55 capable of engaging with one of the cells walls 46 at the right end of the honeycomb core 44. In addition, each of the support parts 55 formed on the inwardly facing surface of the right wall 13c of the housing body 13 can be divided into some parts in the vertical direction.

When the cell walls 46 at the right end of the honeycomb core 44 are slidably fitted into the grooves 56 of the support parts 55, the support parts 55 hold the honeycomb core 44 such that the honeycomb core 44 cannot move in the front-back direction (vertical direction in FIG. 6). Further, in a case that each of the grooves 56 has narrower width, when the cell walls 46 at the right end of the honeycomb core 44 are pressed into the grooves 56, the support parts 55 hold the honeycomb core 44 such that the honeycomb core 44 cannot move in the front-back direction and the vertical direction. In addition, a stopper can be provided to an upper end of each groove 56 such that when the corresponding cell wall 46 is engaged with the groove 56 and is moved to a predetermined position, the stopper comes into contact with the upper end of the corresponding cell wall 46 in order to prevent further upward movement of the honeycomb core 44. In this embodiment, the honeycomb core 44 is disposed in the main adsorption chamber 17 such that the honeycomb core 44 is positioned away from the front wall 13a and the rear wall 13b of the housing body 13 in the front-back direction (vertical direction in FIG. 6).

In accordance with this embodiment, because the support parts 55 are formed on the inwardly facing surface for the main adsorption chamber 17, it is able to hold the honeycomb core 44 in the predetermined position. In addition, because it is able to easily transfer heat from the honeycomb core 44 to the housing 12 via the support parts 55, radiation performance to the environment can be improved much more. Although each of the support parts 55 has the groove 56 capable of engaging with the cell wall 46 in this embodiment, the support parts 55 can be configured to project from the inwardly facing surface for the main adsorption chamber 17 such that the support parts 55 engage with concave portions, each of which is formed between a pair of the cells 48 adjacent to each other, at the right and left ends or the front and rear ends of the honeycomb core 44.

Figure 7:
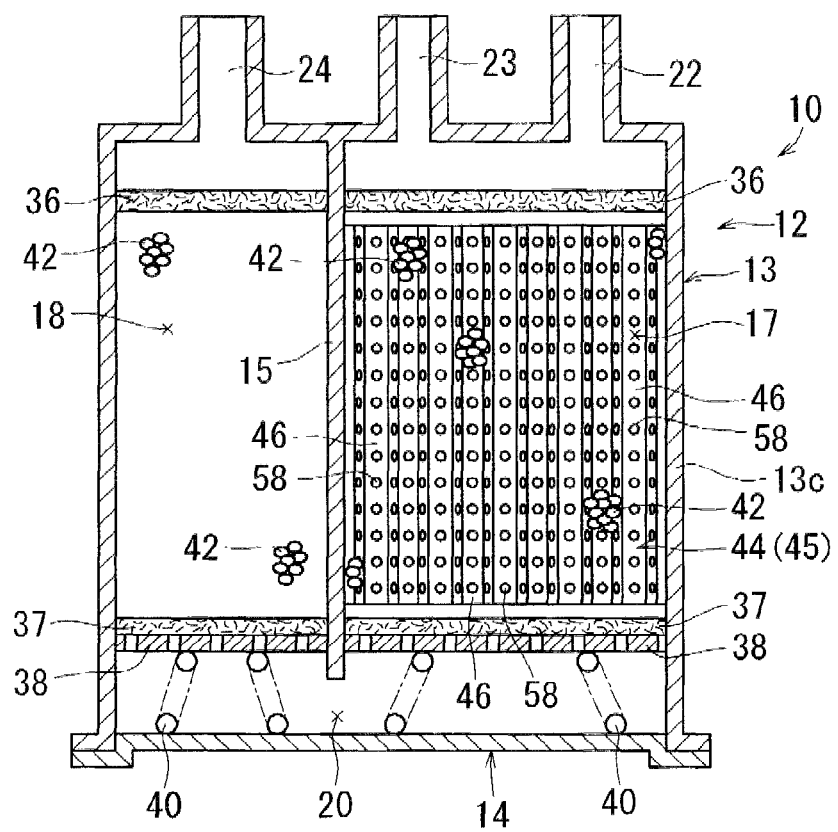
FIG. 7 is a schematic cross-sectional view of the adsorbent canister in a third embodiment.
Figure 8:
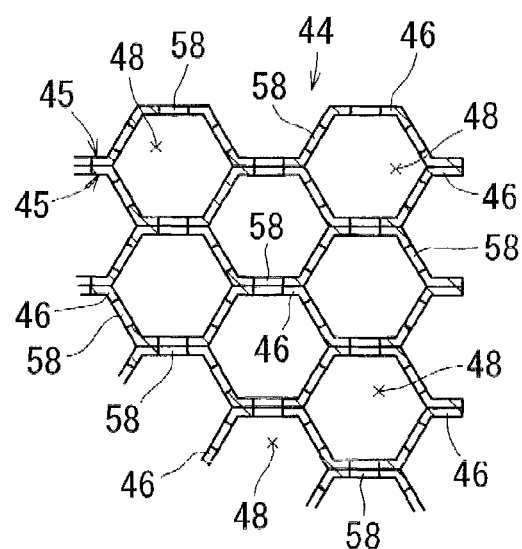
FIG. 8 is a cross-sectional view showing a portion of the honeycomb core.

A third embodiment will be described. This embodiment substantially corresponds to the first embodiment further having some changes. Thus, such changes will be described, and the same configurations will not be described. FIG. 7 is a schematic cross-sectional view showing the adsorbent canister. FIG. 8 is a cross-sectional view showing a portion of the honeycomb core. As shown in FIGS. 7 and 8, the cell walls 46 of the honeycomb core 44 have a plurality of circle-shaped holes 58. Each of the holes 58 passes through the cell wall 46 such that the cells 48 are fluidly connected each other via the holes 58 (FIG. 8). The holes 58 are positioned at regular intervals in the axial direction of the cell walls 46 (vertical direction in FIG. 7). For example, the holes 58 can be easily formed by punching the layered structure 50 for the honeycomb core 44 in the layered direction (FIG. 5).

In accordance with this embodiment, because the adjacent cells 48 are fluidly connected with each other via the holes 58, it is able to flow gas (including air and/or fuel vapor) between the adjacent cells 48. Thus, while the gas flows through the honeycomb core 44, gas flow is aligned at entrance of the honeycomb core 44 and the holes 58 decrease variability of flow resistances in the honeycomb core 44. Accordingly, it is able to decrease difference of flow resistances in each cell 48 and to ensure even adsorption and desorption performance in the cells 48. Although all cell walls 46 have the holes 58 in this embodiment, it is able to adequately change the number of the holes 58 formed on the six cell walls 46 of each cell 48 (i.e., the holes 58 that each cell 48 has in its circumference direction) and the number of the holes 58 aligned in the axial direction of the cells 48. In addition, each of the holes 58 can be formed in polygonal shape, elongated shape or the like instead of circular shape. It is able to form the holes 58 such that each of the holes 58 extends from one cell wall 46 to another adjacent cell wall 46. Instead of the holes 58, the cell walls 46 bound to each other have at least one gap between them for passing through the bound part such that the cells 48 are fluidly connected with each other via the gap.

Figure 9:
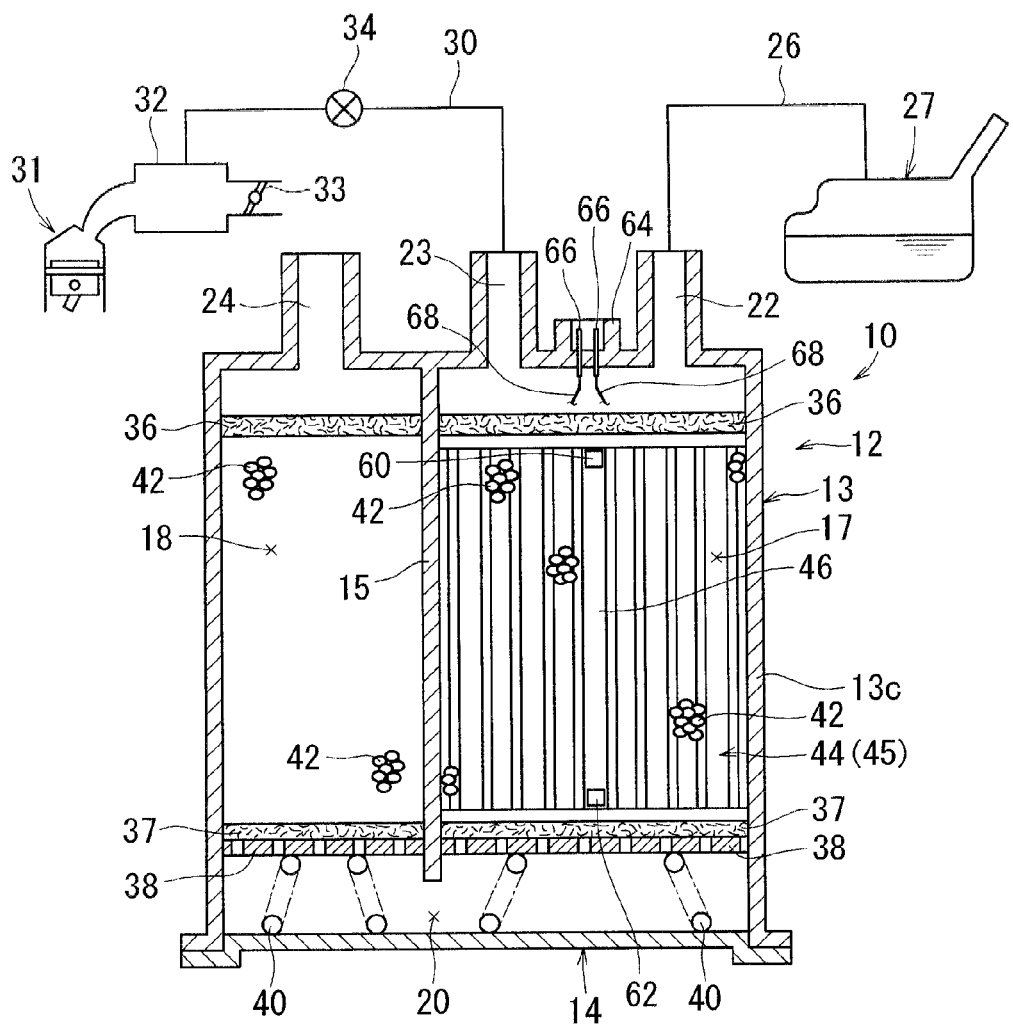
FIG. 9 is a schematic cross-sectional view of the adsorbent canister in a fourth embodiment.

A fourth embodiment will be described. This embodiment substantially corresponds to the first embodiment further having some changes. Thus, such changes will be described, and the same configurations will not be described. FIG. 9 is a schematic cross-sectional view showing the adsorbent canister 10 in the fourth embodiment. In this embodiment, the honeycomb core 44 is made of the metal films 45, which produce heat when applying current, for example, stainless film. In addition, the honeycomb core 44 has an electrode 60 at an upper end of the cell wall 46 positioned at a center in the right-left direction and an electrode 62 at a lower end of the cell wall 46. For example, the electrode 60 is configured as positive electrode whereas the electrode 62 is configured as negative electrode.

As shown in FIG. 9, the housing body 13 has a connector 64 formed on the upper wall above the main adsorption chamber 17. The connector 64 is disposed between the tank port 22 and the purge port 23. The connector 64 has a pair of terminals 66 therein. The terminals 66 are electrically connected to the electrodes 60 and 62 via lead wires 68, respectively. The connector 64 is connected to the ECU such that the ECU can control to apply current to the honeycomb core 44.

During desorption of the fuel vapor from the adsorbent 42, the ECU operates to apply current to the honeycomb core 44 such that the honeycomb core 44 produces heat and temperature of the honeycomb core 44 increases. Thus, because the honeycomb core 44 transfers heat to the adsorbent 42 around the honeycomb core 44, so decrease in temperature of the adsorbent 42 in the main adsorption chamber 17 is prevented during desorption of the fuel vapor. Accordingly, it is able to improve desorption ability of the adsorbent 42 in the main adsorption chamber 17.

In accordance with the adsorbent canister 10, because the honeycomb core 44 produces heat due to power distribution, the adsorbent canister 10 can achieve higher heat-transfer efficiency in the main adsorption chamber 17 than a conventional adsorbent canister having a heater and a heat sink that transfers heat from the heater to an adsorbent filled in the adsorbent canister. In addition, because the honeycomb core 44 has a large surface area, the honeycomb core 44 can equalize temperature distribution in the main adsorption chamber 17 while heating. Thus, the honeycomb core 44 can improve desorption ability of the adsorbent 42 filled in the main adsorption chamber 17 due to improvement of heat-transfer efficiency and equalization of temperature distribution. Accordingly, a small amount of purge gas (ambient air) can sufficiently desorb the fuel vapor from the adsorbent 42, so that the adsorbent canister 10 of this embodiment is suitable for a vehicle quipped with an engine that runs for a shorter time, for example, hybrid electric vehicle (HEV).

Furthermore, when applying current to the honeycomb core 44 during desorption of the fuel vapor from the adsorbent 42, because the whole honeycomb core 44 produces heat, temperature throughout the honeycomb core 44 equally increases. Thus, it is able to efficiently heat the adsorbent 42 throughout the main adsorption chamber 17 and thus to improve desorption ability of the adsorbent 42 filled in the main adsorption chamber 17. Accordingly, the honeycomb core 44 is effective for downsize of the adsorbent canister 10.

Figure 10:
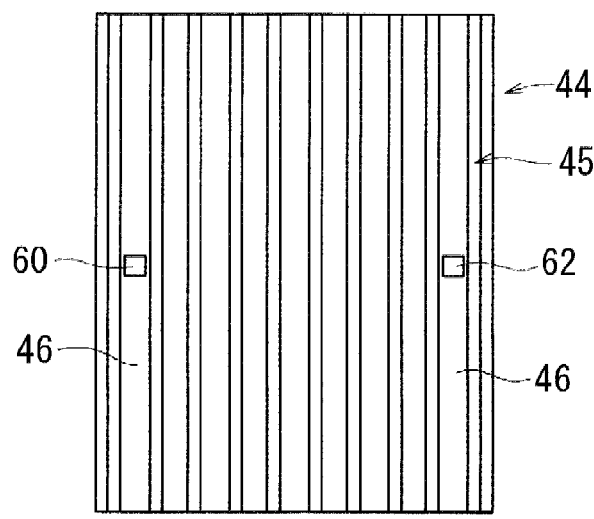
FIG. 10 is a front view of the honeycomb core in a fifth embodiment.

A fifth embodiment will be described. This embodiment substantially corresponds to the fourth embodiment further having some changes. Thus, such changes will be described, and the same configurations will not be described. FIG. 10 is a front view showing the honeycomb core 44 in the fifth embodiment. As shown in FIG. 10, the electrode 60 is attached to the cell wall 46 positioned at the left end of the honeycomb core 44 such that the electrode 60 is in the center in the vertical direction. On the other hand, the electrode 62 is attached to the cell wall 46 positioned at the right end of the honeycomb core 44 in the same manner as the electrode 60.

Furthermore, the electrodes 60, 62 can be attached to the honeycomb core 44 as below. For example, the electrode 60 can be attached to the cell wall 46 at an upper left corner of the honeycomb core 44, whereas the electrode 62 can be attached to the cell wall 46 at a lower right corner of the honeycomb core 44. Alternately, the electrode 60 can be attached to the cell wall 46 at a front and upper end of the honeycomb core 44, whereas the electrode 62 can be attached to the cell wall 46 at a rear and lower end of the honeycomb core 44. In this way, the electrodes 60, 62 are located away from each other in at least one of vertical, right-left and front-back directions. Preferably, a distance between the electrodes 60, 62 is long. In addition, the honeycomb core 44 can have a plurality of the electrodes 60 and/or the electrodes 62.

Figure 11:
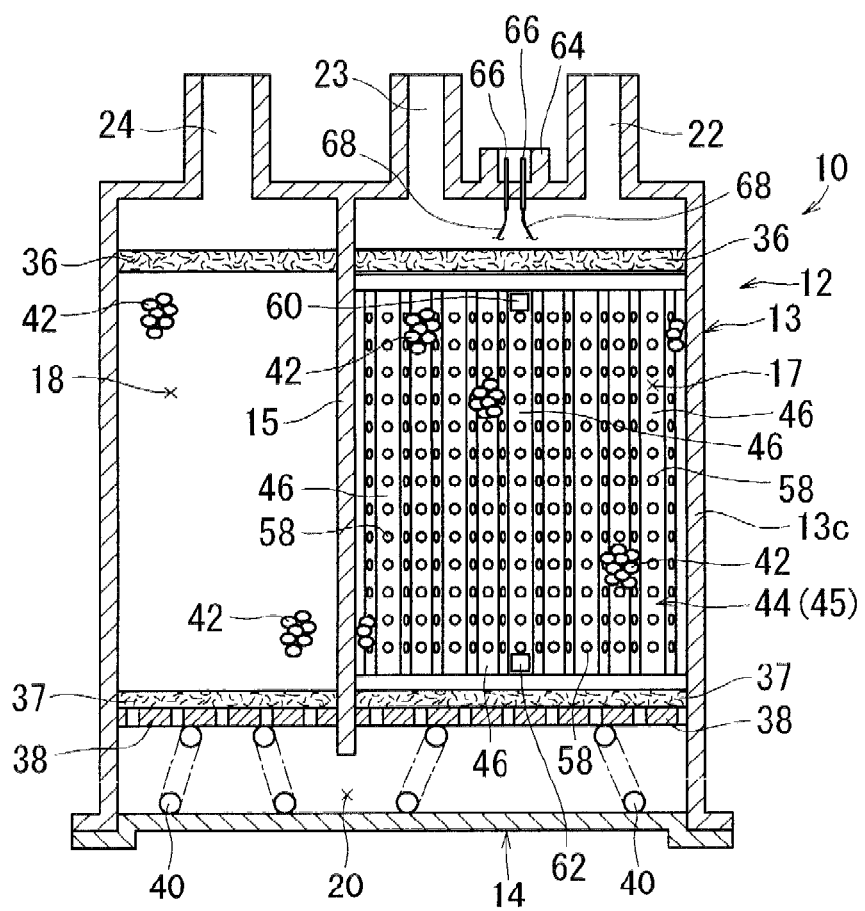
FIG. 11 is a schematic cross-sectional view of the adsorbent canister in a sixth embodiment.

A sixth embodiment will be described. This embodiment substantially corresponds to the fourth embodiment further having some changes. Thus, such changes will be described, and the same configurations will not be described. As shown in FIG. 11, the cell walls 46 of the honeycomb core 44 have a plurality of circular-shaped holes 58 in the same manner as the third embodiment. Each of the holes 58 passes through the cell wall 46 such that the adjacent cells 48 are fluidly connected with each other. The holes 58 are positioned at regular intervals in the axial direction of the cell walls 46.

A seventh embodiment will be described. This embodiment substantially corresponds to the first embodiment further having some changes. Thus, such changes will be described, and the same configurations will not be described. In this embodiment, the honeycomb core 44 forms a heating unit 71 together with PTC (positive temperature coefficient) heaters 73 as shown in FIGS. 12-15. Because the honeycomb core 44 is made of the metal films 45 having higher thermal conductivity than the adsorbent 42, when applying current to the PTC heaters 73, the PTC heaters 73 produce heat and the honeycomb core 44 efficiently transfers heat from the PTC heaters 73 to the adsorbent 42 filled in the main adsorption chamber 17.

Figure 15:
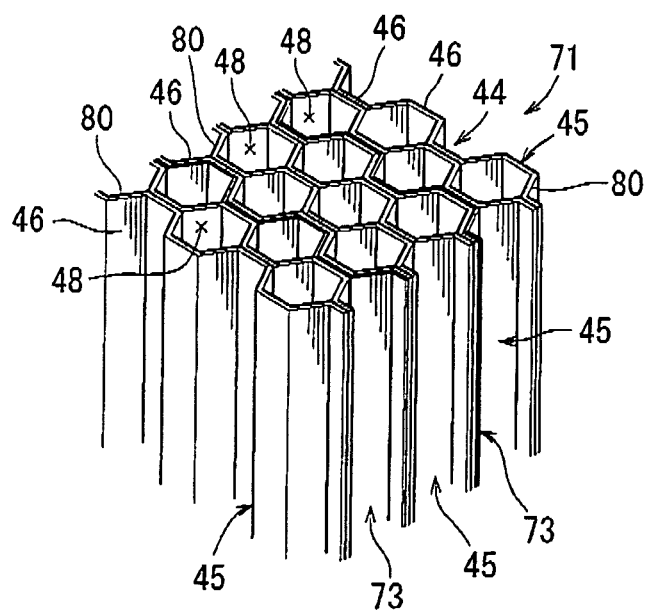
FIG. 15 is a perspective view showing a portion of the honeycomb core in the seventh embodiment.

As shown in FIG. 15, the PTC heaters 73 each formed in a flexible film shape are disposed along one surface of some (two each corresponding to third films from either front or rear surface in this embodiment) of the metal films 45. Thus, the heating unit 71 has the triple-walled cell walls 46 each composed of double-layered metal films 45 bound to each other and the PTC heater 73, the double-walled cell walls 46 each composed of the double-layered metal films 45 bound to each other or a combination of the single metal film 45 and the PTC heater 73, and the single-walled cell walls 46 each composed of the single metal film 45.

Figure 16:
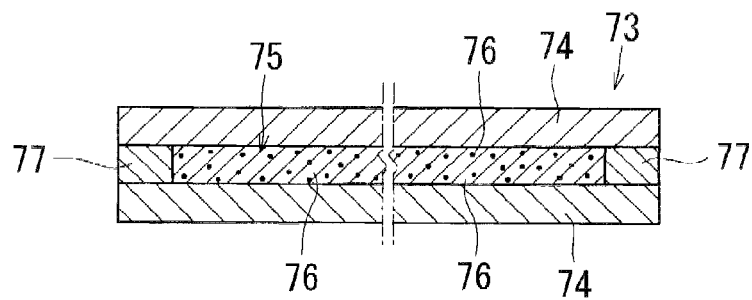
FIG. 16 is a schematic cross-sectional view showing a PTC heater.

FIG. 16 is a cross-sectional view of the PTC heater 73. Each of the PTC heaters 73 is composed of a pair of insulated films 74 and a heating element 75 disposed between the insulated films 74. One of the insulated films 74 (lower one in FIG. 16) is bonded to the metal film 45. The heating element 75 is made from polymer compound mixed with conducting particles 76 and is formed on the lower insulated film 74, for example, by a printing means. In addition, a pair of electrodes 77 for equally applying current to the heating element 75 are disposed both sides of the heating element 75, for example, by the printing means. Whereas, the upper insulated film 74 is bonded on the heating element 75 (and the electrodes 77). For example, the PTC heater 73 can be composed of an automatic temperature controllable heater having a thin-film shape, which is disclosed in Japanese Laid-Open Patent Publication No. H10-32146.

In manufacture of the heating unit 71, the metal films 45 are layered such that the PTC heaters 73 are positioned on a lower surface of the third metal film 45 from the bottom and an upper surface of the sixth metal film 45 from the bottom in the layered structure 50, respectively. Other configurations are substantially same as the first embodiment.

Figure 12:
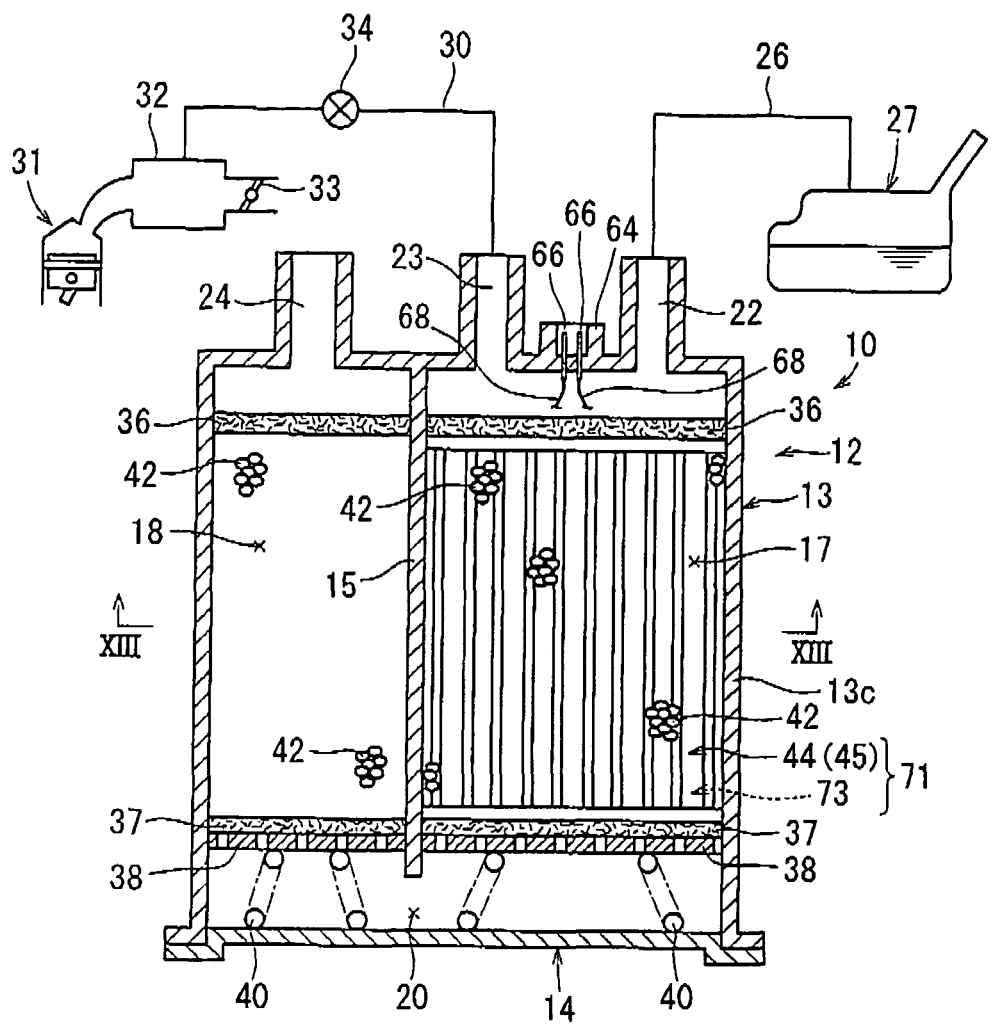
FIG. 12 is a schematic cross-sectional view of the adsorbent canister in a seventh embodiment.
Figure 13:
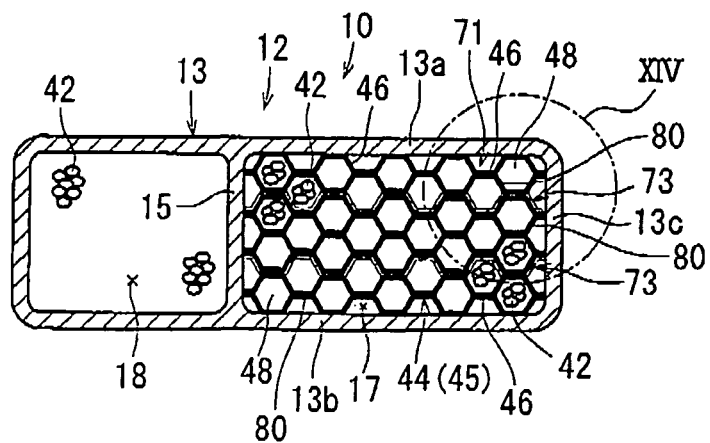
FIG. 13 is a cross-sectional view along line XIII-XIII in FIG. 12.
Figure 14:
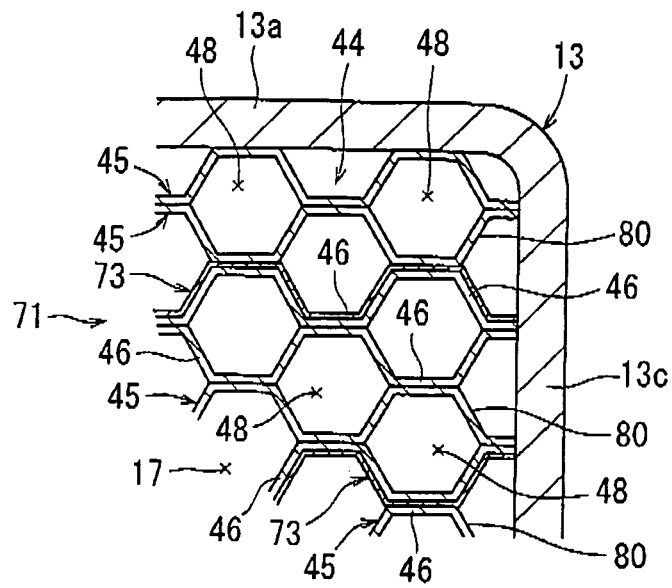
FIG. 14 is an enlarge view showing a portion XIV in FIG. 13.

As shown in FIG. 12, the housing body 13 has a connector 64 formed on the upper wall above the main adsorption chamber 17. The connector 64 is disposed between the tank port 22 and the purge port 23. The connector 64 has a pair of terminals 66 therein. The terminals 66 are electrically connected to the electrodes 77 of the PTC heaters 73 via lead wires 68. The connector 64 is connected to the ECU such that the ECU can control to apply current to the PTC heaters 73.

During desorption of the fuel vapor from the adsorbent 42, the ECU operates to apply current to the PTC heaters 73 such that the heating elements 75 produce heat. Then, the honeycomb core 44 transfers heat from the heating elements 75 to the adsorbents 42 filled in the main adsorption chamber 17. Thus, decrease in temperature of the adsorbent 42 is prevented during desorption of the fuel vapor, so that it is able to improve desorption ability of the adsorbent 42 in the main adsorption chamber 17.

In this embodiment, the cell walls 46 of the honeycomb core 44 are made of the metal films 45 that are thinner than fins of a conventional heat sink. Accordingly, it is able to decrease flow resistance and to improve responsiveness to heat compared with such conventional heat sink.

The PTC heaters 73 are formed as flexible film and are disposed between the metal films 45 of the honeycomb core 44. Thus, each of the PTC heaters 73 has a large surface area coming into contact with the adjacent metal films 45, so that the PTC heaters 73 can easily and efficiently transfer heat to the metal films 45 and thus the honeycomb core 44. In addition, because the PTC heaters 73 are deformable, when the layered structure 50 for the honeycomb core 44 is expanded during manufacture procedure, the PTC heaters 73 can change shapes thereof depending on deformation of the metal films 45.

The honeycomb core 44 is divided into some (three in this embodiment) parts 80 by the PTC heaters 73. That is, each of the PTC heaters 73 are disposed between a pair of the parts 80 adjacent to each other, so that heat-transfer efficiency from the PTC heaters 73 to the parts 80 of the honeycomb core 44 is improved.

In accordance with the adsorbent canister 10, when the PTC heaters 73 produce heat during desorption of the fuel vapor from the adsorbent 42, the honeycomb core 44 transfers heat from the PTC heaters 73 to the adsorbent 42. Thus, it is able to prevent temperature decrease of the adsorbent and to improve desorption ability of the adsorbent 42. Accordingly, a small amount of purge gas (ambient air) can sufficiently desorb the fuel vapor from the adsorbent 42, so that the adsorbent canister 10 of this embodiment is suitable for a vehicle quipped with an engine that runs for a shorter time, for example, hybrid electric vehicle (HEV).

Furthermore, when the PTC heaters 73 produce heat during desorption of the fuel vapor from the adsorbent 42, heat is transferred to whole of the honeycomb core 44 such that temperature distribution in the honeycomb core 44 is equalized. Thus, it is able to efficiently heat the adsorbent 42 throughout the main adsorption chamber 17 and thus to improve desorption ability of the adsorbent 42 filled in the main adsorption chamber 17. Accordingly, the heating unit 71 is effective for downsize of the adsorbent canister 10.

Figure 17:
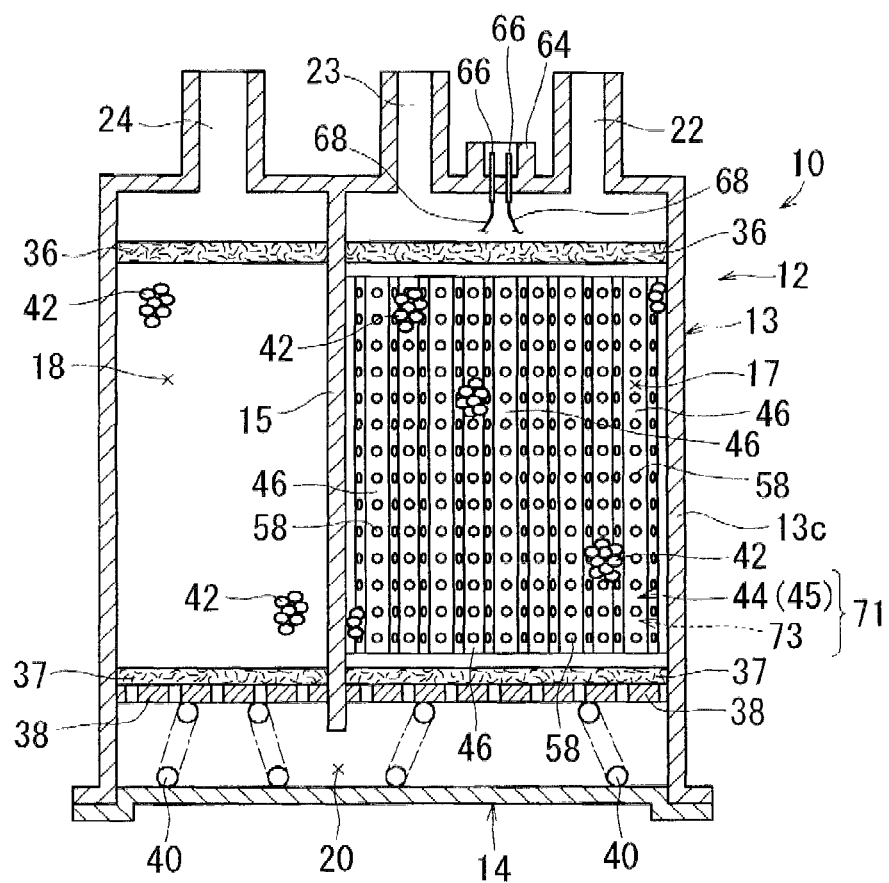
FIG. 17 is a schematic cross-sectional view of the adsorbent canister in an eighth embodiment.
Figure 18:
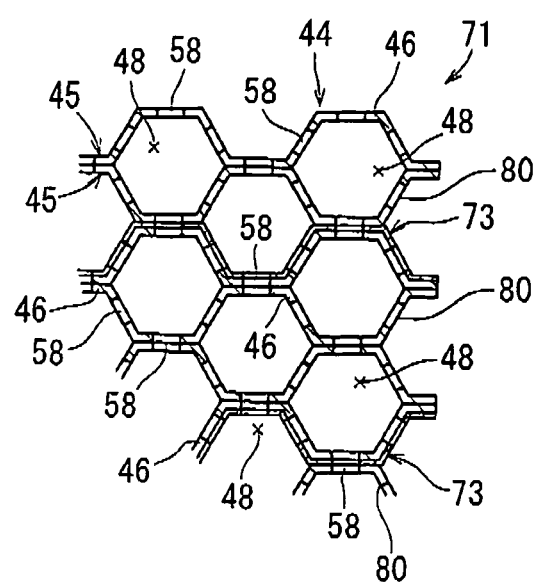
FIG. 18 is a cross-sectional view showing a portion of the honeycomb core in the eighth embodiment.

An eighth embodiment will be described. This embodiment substantially corresponds to the seventh embodiment further having some changes. Thus, such changes will be described, and the same configurations will not be described. As shown in FIGS. 17 and 18, the cell walls 46 of the heating unit 71 have a plurality of holes 58 in a circular shape in the same manner as the third embodiment. Each of the holes 58 passes through the cell wall 46 such that the adjacent cells 48 are fluidly connected each other. The holes 58 are positioned at regular intervals in the axial direction of the cell walls 46.

The adsorbent canisters of this disclosure are not limited to the above-described embodiments. For example, the honeycomb core 44 can be disposed in the main adsorption chamber 17 such that the honeycomb core 44 does not come into contact with the housing body 13. The honeycomb core 44 can be disposed in the main adsorption chamber 17 such that the axis of the honeycomb core 44 is not parallel to the flow direction of the gas in the main adsorption chamber 17 (vertical direction in FIG. 1). The honeycomb core 44 can be provided in the auxiliary adsorption chamber 18. The adsorbent 42 can be attached to the cell walls 46 of the honeycomb core 44 instead of being filled in the main adsorption chamber 17. In addition, the honeycomb core 44 can be shaped such that each cell 48 of the honeycomb core 44 is polygonal shape such as hexagonal shape having non-uniform angles and bases instead of regular hexagon.

With respect to the heater, a thermal spraying heater, a polyimide heater or the like can be used instead of PTC heater. The heater is not limited to the one having flexibility, and can be made from material not having flexibility. The heater can be shaped as line or bar shape instead of film (plane) shape.

This invention claims:

1. An adsorbent canister comprising:
   a housing defining an adsorption chamber therein;
   an adsorbent filled in the adsorption chamber; and
   a honeycomb core that is made from metal films having a higher thermal conductivity than the adsorbent, defines therein a plurality of cells passing through the honeycomb core and is disposed in the adsorption chamber;
   wherein a distance between each pair of the parallel cell walls in the honeycomb shape is between 9.0 and 25.4 mm; and
   wherein the cells of the honeycomb core are filled with the adsorbent.

2. The adsorbent canister according to claim 1, wherein an axis of the each cell is parallel to a flow direction of gas in the adsorption chamber.

3. The adsorbent canister according to claim 1, wherein the honeycomb core is made of a plurality of layered metal films such that the two adjacent metal films are bound to each other at regular intervals.

4. The adsorbent canister according to claim 1, wherein the honeycomb core directly contacts with the housing.

5. The adsorbent canister according to claim 1, wherein the housing has a support member for holding the honeycomb core.

6. The adsorbent canister according to claim 1, wherein the honeycomb core has at least one hole fluidly connecting the cells each other.

7. The adsorbent canister according to claim 1, wherein the material for the honeycomb core produces heat when current is applied to the material.

8. The adsorbent canister according to claim 1, further comprising a heater attached to the honeycomb core.

9. The adsorbent canister according to claim 8, wherein the honeycomb core is composed of a plurality of parts; and the heater is formed in a film shape and is disposed between the parts.

10. The adsorbent canister according to claim 8, wherein the honeycomb core is made of a plurality of metal films; and the heater is formed in a flexible film shape and is disposed between the metal films.

11. The adsorbent canister according to claim 8, wherein the heater is composed of a positive temperature coefficient heater.

* * * * *